(12) United States Patent
Gomez et al.

(10) Patent No.: US 10,259,745 B2
(45) Date of Patent: Apr. 16, 2019

(54) LOW TEMPERATURE CHEMICAL STRENGTHENING PROCESS FOR GLASS

(71) Applicant: CORNING INCORPORATED, Corning, NY (US)

(72) Inventors: Sinue Gomez, Corning, NY (US); Xiaoju Guo, Painted Post, NY (US); Pascale Oram, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 246 days.

(21) Appl. No.: 15/051,044

(22) Filed: Feb. 23, 2016

(65) Prior Publication Data

US 2016/0251262 A1    Sep. 1, 2016

Related U.S. Application Data

(60) Provisional application No. 62/121,693, filed on Feb. 27, 2015.

(51) Int. Cl.
*C03C 21/00* (2006.01)

(52) U.S. Cl.
CPC .......... *C03C 21/002* (2013.01); *C03C 21/001* (2013.01); *C03C 21/005* (2013.01)

(58) Field of Classification Search
CPC .................................................. C03C 21/002
See application file for complete search history.

(56) References Cited

U.S. PATENT DOCUMENTS

| | | | |
|---|---|---|---|
| 3,410,673 A | 11/1968 | Marusak | |
| 3,660,060 A | 5/1972 | Spanoudis | |
| 3,661,545 A * | 5/1972 | Bartholomew | ....... C03C 21/002 |
| | | | 65/30.14 |
| 5,591,374 A | 1/1997 | Kniep et al. | |
| 5,728,316 A | 3/1998 | Kniep et al. | |
| 5,886,940 A | 3/1999 | Moranzo et al. | |
| 6,627,106 B1 | 9/2003 | Lotz et al. | |
| 9,133,383 B2 | 9/2015 | Lazzari et al. | |
| 2005/0096210 A1 | 5/2005 | Kawai | |
| 2009/0277222 A1 | 11/2009 | Iwata et al. | |
| 2010/0028607 A1 | 2/2010 | Lee et al. | |
| 2010/0038581 A1 | 2/2010 | Gladen et al. | |
| 2011/0019354 A1 | 1/2011 | Prest et al. | |
| 2011/0151282 A1 | 6/2011 | Nagashima | |
| 2011/0294649 A1 | 12/2011 | Gomez et al. | |
| 2011/0312483 A1 * | 12/2011 | Nakashima | ............. C03C 3/083 |
| | | | 501/70 |
| 2012/0210749 A1 | 8/2012 | Feng et al. | |
| 2015/0239775 A1 | 8/2015 | Amin et al. | |
| 2015/0239776 A1 | 8/2015 | Amin et al. | |

FOREIGN PATENT DOCUMENTS

| | | |
|---|---|---|
| EP | 49761 A1 | 4/1982 |
| WO | 2016007408 | 1/2016 |

OTHER PUBLICATIONS

International Search Report and Written Opinion of the International Searching Authority; PCT/US2016/019017; dated Sep. 8, 2016; 16 pages; European Patent Office.

Bergman et al. (Izvestjia_Sektora) "Densities and Viscosity of the Ternary System Consisting of Sodium, Potassium, and Calcium Nitrates" USSR Academy of Sciences, Proceedings of the Division of Physico-Chemical Analysis, vol. XXVI, Moscow 1955. pp. 156-163 (with English translation).

* cited by examiner

*Primary Examiner* — Cynthia Szewczyk
(74) *Attorney, Agent, or Firm* — Kevin M. Johnson

(57) ABSTRACT

A method of chemically strengthening a glass. The method includes heating an ion exchange solution to a temperature less than about 360° C., and contacting the glass and the strengthening solution at the temperature for a duration from about 0.5 hours to about 24 hours. The ion exchange solution includes a primary nitrate and at least one monovalent or divalent cation nitrate component in an amount from about 1 wt. % to about 10 wt. %.

13 Claims, 1 Drawing Sheet

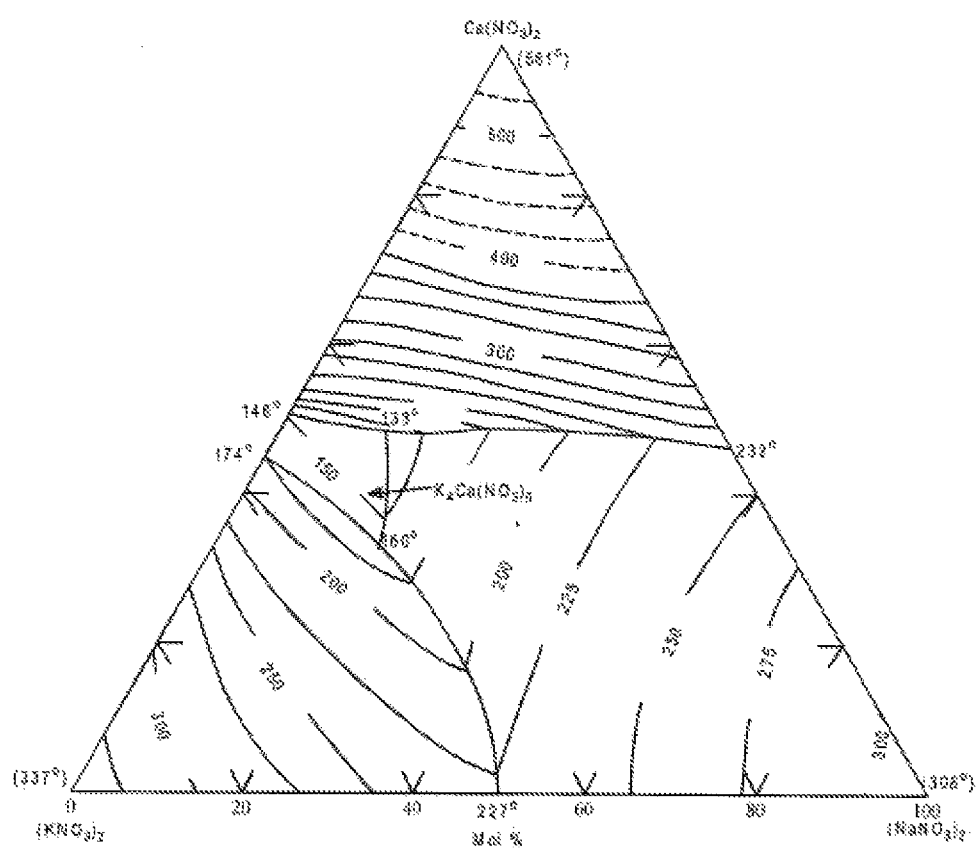

LOW TEMPERATURE CHEMICAL STRENGTHENING PROCESS FOR GLASS

CROSS-REFERENCE TO RELATED APPLICATIONS

This application claims the benefit of priority under 35 U.S.C. § 119 of U.S. Provisional Application Ser. No. 62/121,693 filed on Feb. 27, 2015 the content of which is relied upon and incorporated herein by reference in its entirety.

BACKGROUND

Field

The present specification generally relates to processes for chemically strengthening glass, and more particularly, to low-temperature processes for chemically strengthening glass. Even more particularly, the present specification relates to low-temperature processes for chemically strengthening glass in an ion exchange solution that includes additives.

Technical Background

Chemically strengthened glass has recently been used in hand held devices, such as mobile phones, media players, and other devices, as well as other applications requiring high strength and abrasion resistance.

Ion exchange is a chemical strengthening process that starts with a glass containing smaller ions (effluent ions) that are capable of being exchanged with larger ions (exchange ions) in an ion exchange solution at elevated temperatures. In the ion exchange process, the larger exchange ions replace the smaller effluent ions in the glass. The larger, densely packed ions at the glass surface generate a high compressive stress, which in turn provides higher strength.

Conventionally, the temperature of the ion exchange solution during the ion exchange process is between 370° C. and 550° C. to strengthen glass for consumer product applications. The high temperatures required in conventional ion exchange processes can result in the breakdown of salts in the ion exchange solution forming byproducts that may have an effect on the visual properties of the glass and, in some cases, can be caustic.

Accordingly, a need exists for low-temperature ion exchange processes.

SUMMARY

According to one embodiment, a method of chemically strengthening a glass is described. The method comprises heating an ion exchange solution to a temperature less than about 360° C., and contacting the glass and the strengthening solution at the temperature for a duration from about 0.5 hours to about 24 hours. The ion exchange solution comprises a primary nitrate component and at least one monovalent or divalent cation nitrate component that is different from the primary nitrate in an amount from about 1 wt. % to about 10 wt. %.

In another embodiment, a method of chemically strengthening a glass is disclosed. The method comprises heating a first ion exchange solution to a first temperature from about 390° C. to about 480° C., and contacting the glass and the first ion exchange solution at the first temperature for a duration from about 5 hours to about 45 hours. The method further comprises heating a second ion exchange solution to a second temperature less than about 360° C., and contacting the glass and the second ion exchange solution at the second temperature for a duration from about 0.5 hours to about 24 hours. In the method, the glass is contacted with the first ion exchange solution at the first temperature before the glass is contacted with the second ion exchange solution at the second temperature, and the second ion exchange solution comprises a primary nitrate component and at least one monovalent or divalent cation nitrate component that is different from the primary nitrate in an amount from about 1 wt. % to about 10 wt. %.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 is a ternary phase diagram of a $KNO_3$—$NaNO_3$—$Ca(NO_3)_2$ system according to embodiments described herein.

DETAILED DESCRIPTION

Reference will now be made in detail to embodiments of processes for chemically strengthening glass. In embodiments a method for chemically strengthening glass comprises heating an ion exchange solution to a temperature less than about 360° C., and contacting the glass and the strengthening solution at the temperature for a duration from about 0.5 hours to about 6 hours. The ion exchange solution comprises a primary nitrate and at least one monovalent or divalent cation nitrate component that is different from the primary nitrate in an amount from about 1 wt. % to about 10 wt. %. As used herein "monovalent or divalent cation nitrate," "additional cation nitrate," and "additional nitrate" refers to a monovalent or divalent cation nitrate that is present in the ion exchange solution in addition to, and that is different from, a primary nitrate present in the ion exchange solution. Various embodiments of methods for chemically strengthening glass will be described in further detail herein with specific reference to the appended drawing.

In other embodiments, a method comprises heating a first ion exchange solution to a first temperature from about 390° C. to about 480° C., and contacting the glass and the first ion exchange solution at the first temperature for a duration from about 5 hours to about 45 hours. The method further comprises heating a second ion exchange solution to a second temperature less than about 360° C., and contacting the glass and the second ion exchange solution at the second temperature for a duration from about 0.5 hours to about 6 hours. In the method, the glass is contacted with the first ion exchange solution at the first temperature before the glass is contacted with the second ion exchange solution at the second temperature, and the second ion exchange solution comprises a primary nitrate and at least one monovalent or divalent cation nitrate component that is different from the primary nitrate in an amount from about 1 wt. % to about 10 wt. %.

Various embodiments of methods for chemically strengthening glass will be described in further detail herein with specific reference to the appended drawing.

Any glass that is capable of being ion exchanged may be used in the methods described herein. In embodiments, the glass is an alkali aluminosilicate glass. In some embodiments, the alkali aluminosilicate glass comprises: 56-73 mol. % $SiO_2$; 6-25 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; 0-10 mol. % $P_2O_5$; 0-10 mol. % ZnO; 0-5 mol. % $TiO_2$; less than 50 ppm $As_2O_3$; and less than 50 ppm $Sb_2O_3$. In embodiments, the glass meets the following inequalities: 12 mol. %≤$Li_2O+Na_2O+K_2O$ 20 mol. % and 0 mol. %≤MgO+CaO+ZnO≤10 mol. %. In some embodiments, the alkali aluminosilicate glass is substantially free of lithium. In other embodiments, the alkali aluminosilicate glass is substantially free of at least one of arsenic, antimony, and barium. In embodiments, the alkali aluminosilicate glass is down-drawable by techniques such as fusion-draw processes, slot-draw processes, and re-draw processes.

Surface compressive stress (also referred to herein as "compressive stress") and the depth of the compressive stress layer (also referred to herein as "depth of layer") are two factors that affect the performance of chemically strengthened glass. The combination of the compressive stress and the depth of layer of the compressive stress protect against the propagation of micro-flaws that are artifacts created by glass finishing processes. Compressive stress may also provide resistance to damaging contact forces, such as blunt or sharp impacts. If the depth of layer is adequate, the compressive stress is directly proportional to the strength and impact resistance of the chemically strengthened glass.

As described above, conventional ion exchange processes are conducted at ion exchange solution temperatures of from 370° C. to 550° C. The temperature of the ion exchange solution is chosen within the above range to achieve a desired compressive stress and depth of layer within a given process time. The lower temperature in the conventional range (i.e., 370° C.) is limited, in part, by the melting point of the salt used in the ion exchange solution, such as, for example $KNO_3$ and/or $NaNO_3$. The upper temperature in the above range (i.e., 550° C.) is determined, in part, by the stability of the salt in the ion exchange solution, the need to avoid toxic emissions related to salt decomposition, corrosion of the vessels containing the ion exchange solution by the salt, and the desired strength properties of the glass. For example, impurities in the ion exchange solution, such as those caused by salt decomposition, can lead to the formation of deposits on the glass surface, which can alter the visual quality. Therefore, long ion exchange durations, such as in excess of 60 hours, may be required to achieve high compressive stresses and large depths of layer using low temperature ion exchange solutions. However, if the duration of the ion exchange process is too long, the ion exchange process will not be suitable for large-scale manufacturing. Accordingly, methods of ion exchange strengthening glass articles that both decrease the operating temperature of the ion exchange process and do not negatively affect the strengthening of the glass are needed.

To address the above, ion exchange solutions that promote ion exchange at low temperatures and methods for using these solutions are provided herein. In embodiments, the operating temperature of the ion exchange solution may be reduced by reducing the melting point of the ion exchange solution. In conventional ion exchange processes, the ion exchange solution comprises inorganic nitrate salts, such as $KNO_3$, $NaNO_3$, or combinations thereof. In embodiments, the primary nitrate in the ion exchange solution is $KNO_3$, $NaNO_3$, or mixtures thereof. In some embodiments, the melting point of a conventional ion exchange solution may be lowered by including an additional monovalent or divalent cation nitrate in the ion exchange solution. In embodiments, the additional nitrate is selected from the group consisting of $Ca(NO_3)_2$, $LiNO_3$ $Mg(NO_3)_2$, $Sr(NO_3)_2$, and $AgNO_3$. In some embodiments, the ionic radius of the additional monovalent or divalent cation in the monovalent or divalent cation nitrate is from about 90 pm to about 135 pm, such as from about 90 pm to about 115 pm.

However, not all monovalent and divalent cations can be used in an ion exchange solution. For example, when dehydrated $Ca^{2+}$ is added to an ion exchange solution as CaO, the CaO prevents ion exchange between $Na^+$ ions in the glass and $K^+$ ions in the ion exchange solution, thereby negatively effecting the strengthening of the glass. In contrast, it has been found that when $Ca(NO_3)_2$ was added to conventional ion exchange solutions, the $Ca(NO_3)_2$ did not prevent the exchange of $Na^+$ ions in the glass and $K^+$ ions in the ion exchange solution, thus the strengthening of the glass was not affected. Without being bound to any particular theory, it is believed that cations with larger ionic radii do not diffuse deep into the glass at low temperatures. Thereby, a high concentration of the large ionic-radius cations forms at the surface of the glass article and blocks diffusion of the target ion, such as $K^+$. Accordingly, the additional monovalent or divalent cation nitrate must be carefully selected.

One mechanism by which an additional monovalent or divalent cation nitrate lowers the operating temperature of the ion exchange process is by lowering the melting point of the ion exchange solution. As an example, the melting point of $KNO_3$ is about 337° C. and the melting point of $NaNO_3$ is about 308° C. A mixture of $KNO_3$ and $NaNO_3$ has the eutectic point at a concentration of about 50 wt. % $KNO_3$ and about 50 wt % $NaNO_3$. The melting point at the eutectic point is about 227° C. As the concentration of $KNO_3$ increases in the binary mixture of $KNO_3$ and $NaNO_3$, the melting point of the binary mixture increases from 227° C. (i.e., at the eutectic) to 337° C. (i.e., the melting point of pure $KNO_3$). Likewise, as the concentration of $NaNO_3$ increases in the binary mixture of $KNO_3$ and $NaNO_3$, the melting point of the binary mixture increases from 227° C. (i.e., from the eutectic point) to 308° C. (i.e., at pure $NaNO_3$). Thus, the melting point of an ion exchange solution comprising $KNO_3$, $NaNO_3$, and mixtures thereof is from about 220° C. (i.e., at a 50:50 weight ratio) to about 337° C. (i.e., mostly pure $KNO_3$).

In various embodiments, a monovalent or divalent cation nitrate is added to the ion exchange solution, which forms a eutectic for: (1) a ternary $KNO_3$—$NaNO_3$— (monovalent or divalent cation nitrate) system; (2) a binary $KNO_3$— (monovalent or divalent cation nitrate) system; or (3) a binary $NaNO_3$— (monovalent or divalent cation nitrate) system. For example, FIG. 1 shows a ternary phase diagram for a $KNO_3$—$NaNO_3$—$Ca(NO_3)_2$ system. As shown in FIG. 1, when $Ca(NO_3)_2$ is added to a $KNO_3$, $NaNO_3$, or mixtures thereof, a eutectic is formed that lowers the melting point of the system. By way of example, a 50:50 wt. % mixture of Ca(NO$_3$)$_2$ and KNO$_3$ has a melting point of about 146° C., a 50:50 wt. % mixture of Ca(NO$_3$)$_2$ and NaNO$_3$ has a melting point of about 270° C., and a ternary mixture comprising one third wt. % of each of Ca(NO$_3$)$_2$, KNO$_3$, and NaNO$_3$ has a melting point of about 200° C. Accordingly, the melting point of an ion exchange solution can be lowered by adding a monovalent or divalent cation nitrate, such as, in embodiments, Ca(NO$_3$)$_2$.

The melting point of an ion exchange solution is only one factor that is used to determine the operating temperature of an ion exchange process. For example, the ion exchange solution temperature can be raised to increase the amount of exchange ions that replace effluent ions in the glass matrix, thereby increasing the compressive stress of the glass. Further, raising the ion exchange solution temperature can increase the depth of the compressive stress layer. However, the minimum operating temperature of an ion exchange process is necessarily limited by the melting point of the ion exchange solution because ion exchange will not occur if the components of the ion exchange solution are not melted. In most situations, the operating temperature of the ion exchange process will be above the melting point of the ion exchange solution. Thus, a lower melting point of the ion exchange solution allows the operating temperature of the ion exchange solution to be lowered. Generally, the operating temperature of the ion exchange solution is maintained at temperature that is from about 10° C. to about 20° C. above the melting point of the ion exchange solution. If the operating temperature is maintained at a temperature that is close to the melting point of the ion exchange solution, large amounts of the salts from which the ion exchange solution is made may be deposited on the surface of the glass resulting from localized lowering of the ion exchange solution that is near the glass. For example, the glass will generally be at a lower temperature than the ion exchange solution. Accordingly, when the glass is contacted with the ion exchange solution, the temperature of the ion exchange solution in close proximity to the cooler glass will be lowered, and, if too close to the melting point of the glass, the salt from which the ion exchange solution is made may solidify and form excessive salt deposits on the glass.

As stated above, the conventional operating temperature for ion exchange processes is from about 370° C. to about 550° C. In accordance with the above, monovalent or divalent cation nitrates may be added to conventional ion exchange solutions—such as ion exchange solutions comprising KNO$_3$, NaNO$_3$, and mixtures thereof—to reduce the melting point of the ion exchange solution, thereby allowing the operating temperature of the ion exchange process to also be reduced. In embodiments, the operating temperature of the ion exchange process is less than about 360° C., such as less than about 350° C. In other embodiments, the operating temperature of the ion exchange process is less than about 340° C., such as less than about 330° C. In the above embodiments, the operating temperature of the ion exchange process is greater than about 300° C., such as greater than about 310° C. For example, in embodiments, the operating temperature of the ion exchange process is from about 300° C. to about 360° C., such as from about 305° C. to about 355° C. In other embodiments, the operating temperature of the ion exchange process is from about 310° C. to about 350° C., such as from about 315° C. to about 345° C. In yet other embodiments, operating temperature of the ion exchange process is from about 320° C. to about 340° C., such as from about 325° C. to about 335° C.

In embodiments, to achieve the low ion exchange operating temperatures described above, an additional monovalent or divalent cation nitrate is added to an ion exchange solution in an amount from about 1 wt. % to about 10 wt. %, such as from about 2 wt. % to about 9 wt. %. In other embodiments, an additional monovalent or divalent cation nitrate is added to an ion exchange solution in an amount from about 3 wt. % to about 8 wt. %, such as from about 4 wt. % to about 7 wt. %. In certain embodiments, the additional monovalent or divalent cation nitrate is added to an ion exchange solution in an amount from about 3 wt. % to about 6 wt. %, such as about 5 wt. %. The remainder of the ion exchange solution comprises components of a conventional ion exchange solution, such as KNO$_3$, NaNO$_3$, and mixtures thereof. Thus, in embodiments, the ion exchange solution comprises form about 90 wt. % to about 99 wt. % KNO$_3$, such as from about 91 wt. % to about 98 wt. % KNO$_3$. In other embodiments, the ion exchange solution comprises from about 92 wt. % to about 97 wt. % KNO$_3$, such as from about 93 wt. % to about 96 wt. % KNO$_3$. In certain embodiments, the ion exchange solution consists essentially of from about 90 wt. % to wt 99 wt. % KNO$_3$ and from about 1 wt. % to about 10 wt. % Ca(NO$_3$)$_2$. Although lower melting points can be achieved using an ion exchange solution having a concentration of KNO$_3$ closer to the concentration at the eutectic point, the concentration of KNO$_3$ must also be selected based on the desired compressive stress. For example, a 50/50 wt. % mixture (50/50 mixture) of KNO$_3$ and Ca(NO$_3$)$_2$ may have a lower melting point than a mixture of 90 wt. % KNO$_3$ and 10 wt. % Ca(NO$_3$)$_2$ (90/10 mixture), but the low amount of KNO$_3$ in the 50/50 mixture will not provide as high of a compressive stress as the 90/10 mixture simply because there are less K$^+$ ions available in the 50/50 mixture as there are in the 90/10 mixture. Further, if the operating temperature of the ion exchange process is too low, there will not be sufficient mobility of the exchange ions and the effluent ions to cause efficient ion exchange. Therefore, at very low operating temperatures, the ion exchange process will become so inefficient that it will not be commercially practicable. Accordingly, there is little to no benefit to having a melting point of the ion exchange solution below an efficient operating temperature. In embodiments, the efficient operating temperature is greater than about 280° C., or even greater than about 300° C.

The duration of an ion exchange process using an ion exchange solution comprising a primary nitrate and an additional a monovalent or divalent cation nitrate according to embodiments described herein may be varied depending on the desired properties of the glass (e.g., the desired compressive stress and depth of layer). Further, because the operating temperature of the ion exchange process is lower than in conventional processes, longer durations may be required to achieve the same or similar compressive stress and depth of layer as are achieved in conventional methods. While the increase in ion exchange process duration is less desirable from a throughput perspective (i.e., ion exchange tanks will be less productive), it allows for greater control in compressive stress and depth of layer in the glass. For example, if a conventional ion exchange process requires only 15 minutes to obtain a depth of layer that is 75 µm and a compressive stress that is 800 MPa, the ion exchange happens very quickly and will be hard to control in manually controlled ion exchange processes. However, if a low-temperature ion exchange process takes one hour to reach the same depth of layer of 75 µm and the same compressive stress of 800 MPa, it will be easier to control the exact compressive stress and depth of layer in a manually controlled ion exchange process. According to embodiments described herein, a glass ion exchanged at temperatures well below conventional ion exchange temperatures can have the same or similar compressive stress, compressive stress profile, and DOL glasses made by conventional ion exchange methods at higher temperatures.

In embodiments, the duration of the ion exchange process where the ion exchange solution comprises a primary nitrate and an additional monovalent or divalent cation nitrate is from about 0.5 to about 24 hours, such as from about 1 to about 12 hours. In other embodiments, the duration of the ion exchange process is from about 1 to about 8 hours, such as from about 1 to about 4 hours. In yet other embodiments, the duration of the ion exchange process where the ion exchange solution comprises a primary nitrate and an additional monovalent or divalent cation nitrate is greater than about 8 hours, such as greater than about 12 hours. In other embodiments, the duration of the ion exchange process where the ion exchange solution comprises a primary nitrate and an additional monovalent or divalent cation nitrate is less than about 4 hours, such as greater than about 2 hours.

By using lower ion exchange solution temperatures in the ion exchange process, many advantages may be obtained. For example, low-temperature ion exchange processes reduce warp and damage to glasses that may be caused by exposure to high-temperature ion exchange solutions. Further, breakage and deformation caused by cooling after the ion exchange process can be reduced by using a low-temperature ion exchange solution. The above advantages are particularly pronounced when the glass is a thin glass. It should be understood that a thin glass is more susceptible to deformation, warping, and breakage resulting from thermal cycling to high temperatures than a thicker glass. Accordingly, in embodiments, the glass that is ion exchanged may be a glass sheet having a thickness of less than about 1 mm, such as less than about 0.75 mm. In other embodiments, the glass sheet has a thickness of less than about 0.5 mm, such as less than about 0.25 mm. In some embodiments, the thickness of the glass may be from about 0.05 mm to about 0.2 mm, such as from about 0.075 to about 0.15 mm. In embodiments comprising a thin glass sheet, the depth of layer may be less than about 20 µm, such as less than about 15 µm. In other embodiments comprising a thin glass sheet, the depth of layer is less than about 10 µm.

As stated above, the compressive stress, compressive stress profile, and DOL of glasses formed using a low-temperature ion exchange according to embodiments disclosed herein are similar or improved over the compressive stress, compressive stress profile, and DOL of glass articles formed using conventional ion exchange processes at much higher temperatures. Accordingly, the strength and durability of the glasses formed according to embodiments disclosed herein would be similar to the strength and durability of glasses formed according to conventional ion exchange processes. For example, the glasses formed by methods disclosed and discussed herein would have properties (e.g., compressive stress, compressive stress profile, depth of layer, strength and durability, etc.) that are the same or similar to the properties disclosed in U.S. patent application Ser. Nos. 14/530,073 and 14/530,155, which are incorporated herein by reference in their entirety, and disclose ion exchange processes at high temperatures.

In embodiments, the ion exchange process is a dual stage ion exchange process for strengthening glass and reducing the variability of compressive stress in the glass. The dual stage ion exchange process is capable of maintaining a high and stable, surface compressive strength when chemically strengthening a number of glass articles in a production setting. The process includes a first (primary) exchange stage and a second (secondary) exchange stage. In the primary exchange stage, the glass is strengthened to a desired depth of layer (DOL) in a first ion exchange solution. The first ion exchange solution is diluted with effluent ions (i.e., smaller ions that are removed from the glass matrix and replaced by larger ions). In some embodiments, the first ion exchange solution comprises monovalent or additional cation nitrates as described herein. For example, if $Na^+$ ions are the effluent ions, the first ion exchange solution is diluted with $Na^+$ ions. The presence of the effluent ions in the ion exchange solution decreases the compressive stress of the ion-exchanged glass. However, each additional ion exchange run does not significantly change the percentage of effluent ions in the ion exchange solution, and the compressive stress therefore does not degrade as rapidly as would be the case for an undiluted salt bath. In embodiments, the ion exchange solution in the primary stage is a conventional ion exchange solution that is heated to a temperature from about 390° C. to about 480° C. for a duration from about 5 hours to 45 hours.

In the secondary stage, which follows the primary stage, the glass strengthened in the primary stage is then chemically strengthened in a second ion exchange solution that contains exchange ions (i.e., larger ions that replace the smaller ions in the glass matrix) and a much lower (or zero) effluent ion concentration than in the primary ion exchange solution. The second stage increases the compressive stress to a desired level. In embodiments, the second ion exchange solution comprises additional monovalent or divalent cation nitrates as described herein. The first stage of the dual stage ion exchange process primarily increases the depth of layer and does not significantly increase the compressive stress of the glass, which is effected by the increased amount of effluent ions in the first ion exchange solution. Accordingly, the amount of ion exchanging that occurs in the first stage of the dual stage ion exchange process is an amount sufficient to achieve the desired depth of layer. Conversely, because of the low amount of effluent ions in the second ion exchange solution, the compressive stress increases rapidly in the second stage of the dual ion exchange solution as a high amount of effluent ions in the glass matrix are exchanged with exchange ions in the second ion exchange solution. Thus, only a relatively small amount of ion exchange takes place in the secondary stage. Thus, the rate or degree of salt dilution is significantly reduced in the second stage. In embodiments, the secondary stage ion exchange solution is an ion exchange solution comprising an additional monovalent or divalent cation nitrate as described in embodiments herein.

The dual stage ion exchange process described herein is capable of maintaining consistently high compressive stress in the finished (strengthened) glass, despite increasing effluent ion dilution rate in the primary stage bath. In addition, the process also minimizes equipment downtime associated with salt replacement and provides improved process stability, higher compressive strength values, more efficient salt utilization, and overall higher mechanical reliability of products.

The primary and secondary ion exchange solutions are prepared by adding the desired amount of effluent salt and exchange salt and then melting the mixture. In embodiments, the effluent and exchange ions are alkali metal ions, such as $Li^+$, $Na^+$, $K^+$, $Cs^+$, and $Rb^+$. Larger alkali metal ions (exchange ions) in the ion exchange solution replace smaller alkali metal ions (effluent ions) in the glass. For example, $Na^+$ in the glass matrix can be replaced with $K^+$, $Cs^+$, or $Rb^+$ ions. Typically, the alkali metal ions in the glass are exchanged with ions of the next largest alkali metal ion. For example, Na$^+$ ions in the glass are usually exchanged with K$^+$ ions in the bath. For both the primary and secondary ion exchange solutions, the salt(s) is melted at the temperatures described herein above, and the bath is held at that temperature to stabilize for a predetermined time.

In embodiments, "fresh" unused salt may be used to prepare the primary ion exchange solution. In other embodiments, a previously diluted salt bath may be used as the ion exchange solution. In embodiments, fresh salt is used to prepare the secondary ion exchange solution.

Prior to immersion in the primary ion exchange solution, the glass to be treated is pre-heated to prevent thermal shock and minimize bath loading (i.e., cooling) effects. The pre-heating temperature depends on the operating temperature of the ion exchange process. The sample is then immersed in the primary ion exchange solution, and the primary ion exchange stage is carried out at a first temperature for a duration sufficient to achieve a desired depth of layer, at which point the glass sample is removed from the primary ion exchange solution and allowed to cool. The glass sample may then be rinsed with water to remove residual dried salt and to prevent contamination of the secondary ion exchange solution, and then dried to remove residual moisture. The glass may optionally be annealed between respective immersions in the primary and secondary ion exchange solution.

Before immersion in the secondary ion exchange solution, the glass sample is again pre-heated. The secondary ion exchange stage is carried out in the secondary ion exchange solution having either fresh salt (or a significantly lower dilution rate than the primary ion exchange solution) to increase or stabilize the compressive stress created in the primary stage ion exchange. The sample is immersed in the secondary ion exchange solution, and the secondary ion exchange stage is carried out at a second temperature for a duration sufficient to achieve the desired compressive stress, at which point the glass is removed from the secondary ion exchange solution and allowed to cool. The glass sample may be rinsed with water to remove residual dried salt and to prevent contamination of the secondary stage ion exchange solution, and then dried to remove residual moisture.

Compressive stress resulting from the chemical strengthening process described herein can be measured using either non-destructive methods, such as, for example, the Orihara FSM-6000 stress-optical meter, which measures surface compressive stress, or destructive tests such as four point bend, three point bend, ring on ring, ball drop tests, and the like.

In embodiments, the surface compressive stress in the glass after ion exchange is greater than about 850 MPa, such as greater than about 875 MPa. In other embodiments, the surface compressive stress in the glass after ion exchange is greater than about 900 MPa, such as greater than about 925 MPa. In yet other embodiments, the surface compressive stress is greater than about 950 MPa, such as greater than about 975 MPa. In further embodiments, the surface compressive stress in the glass after ion exchange is greater than about 1000 MPa, such as greater than 1100 MPa. In the above embodiments, the surface compressive stress of the glass after ion exchange is less than about 1200 MPa, such as less than about 1150 MPa. Accordingly, in embodiments, the surface compressive stress of the glass after ion exchange is from about 850 MPa to about 1200 MPa, such as from about 875 MPa to about 1150 MPa. In other embodiments, the surface compressive stress of the glass after ion exchange is from about 900 MPa to about 1100 MPa, such as from about 925 MPa to about 1050 MPa. In yet other embodiments, the surface compressive stress of the glass after ion exchange is from about 950 MPa to about 1025 MPa, such as from about 975 MPa to about 1000 MPa.

In some embodiments, the surface compressive stress is greater than about 250 MPa, such as greater than about 300 MPa. In other embodiments, the surface compressive stress is greater than about 350 MPa, such as greater than about 400 MPa. In still other embodiments, the surface compressive stress is greater than about 450 MPa, such as greater than about 500 MPa. In such embodiments, the surface compressive stress is less than about 850 MPa, such as less than about 800 MPa. In other such embodiments, the surface compressive stress is less than about 750 MPa, such as less than about 700 MPa. Accordingly, in embodiments, the surface compressive stress is from about 250 MPa to about 850 MPa, such as from about 300 MPa to about 800 MPa. In other embodiments, the surface compressive stress is from about 350 MPa to about 750 MPa, such as from about 400 MPa to about 700 MPa. In still other embodiments, the surface compressive stress is from about 450 MPa to about 550 MPa.

Using the processes described herein, the depth of layer can be increased to a desired level. In embodiments, the depth of layer may be from greater than about 40 µm, such as greater than about 45 µm. In other embodiments, the depth of layer may be from greater than about 50 µm, such as greater than about 55 µm. In yet other embodiments, the depth of layer may be from greater than about 60 µm, such as greater than about 65 µm. In still other embodiments, the depth of layer may be from greater than about 70 µm, such as greater than about 75 µm. In the above embodiments, the depth of layer is less than about 150 µm, such as less than about 125 µm. In others of the above embodiments, the depth of layer is less than about 100 µm, such as less than about 90 µm. Accordingly, in embodiments, the depth of layer is from about 40 µm to about 150 µm, such as from about 45 µm to about 125 µm. In other embodiments, the depth of layer is from about 50 µm to about 110 µm, such as from about 55 µm to about 100 µm. In yet other embodiments, the depth of layer is from about 60 µm to about 90 µm, such as from about 65 µm to about 85 µm. In still other embodiments, the depth of layer is from about 70 µm to about 85 µm. In embodiments where the glass is a thin sheet, the depth of layer may be less than about 30 µm, such as less than about 25 µm. In other embodiments where the glass is a thin sheet, the depth of layer may be less than about 20 µm, such as less than about 15 µm. In embodiments where the glass is a thin sheet, the depth of layer may be greater than about 5 µm, such as less than about 10 µm. Accordingly, in embodiments where the glass is a thin sheet, the depth of layer may be from about 5 µm to about 30 µm, such as from about 10 µm to about 25 µm. In other embodiments where the glass is a thin sheet, the depth of layer may be from about 15 µm to about 20 µm.

EXAMPLES

Example

Embodiments will be further clarified by the following examples, which are exemplary only and do not limit the scope of this disclosure.

Eighteen glass sheets were formed according to conventional methods. Six glass sheets were formed from each of the following three glass types: Gorilla® Glass 3, Gorilla® Glass 4, and alkali aluminosilicate glass (all manufactured by Corning).

A primary ion exchange solution was prepared by mixing 55 wt. % KNO₃ and 45 wt. % NaNO₃. The mixture was heated to 450° C. and the eighteen glass sheets were individually immersed in the primary ion exchange solution for the duration shown below in Table 1. Subsequently, the glass sheets were removed from the primary ion exchange solution and rinsed with water to remove any residual ion exchange solution.

A secondary ion exchange solution was prepared by mixing 95 wt. % KNO₃ and 5 wt. % Ca(NO₃)₂. The mixture was then heated to the temperature shown below in Table 1. The glass sheets were then immersed in the secondary ion exchange solution for the duration shown below in Table 1. The glass sheets were removed from the secondary ion exchange solution and rinsed with water to remove residual ion exchange solution.

Surface compressive stress and depth of layer for each sample were measured immediately after the ion exchange process using an Orihara FSM-6000 stress-optical meter. Results from the above measurements are provided below in Table 1.

TABLE 1

| Glass Type | Primary Ion Exchange Duration (hrs) | Secondary Ion Exchange Temperature (° C.) | Secondary Ion Exchange Duration (hrs) | Compressive Stress (MPa) | Depth of Layer (µm) |
| --- | --- | --- | --- | --- | --- |
| 1 | 40 | 340 | 4 | 812 | 83.2 |
| 1 | 40 | 340 | 4 | 824 | 82.6 |
| 1 | 40 | 340 | 1 | 815 | 84.5 |
| 1 | 40 | 340 | 1 | 773 | 84.8 |
| 1 | 40 | 350 | 1 | 850 | 80.9 |
| 1 | 40 | 350 | 1 | 783 | 82.5 |
| 2 | 8 | 340 | 4 | 827 | 70.9 |
| 2 | 8 | 340 | 4 | 828 | 70.7 |
| 2 | 8 | 340 | 1 | 784 | 71.4 |
| 2 | 8 | 340 | 1 | 801 | 71.6 |
| 2 | 8 | 350 | 1 | 780 | 73.1 |
| 2 | 8 | 350 | 1 | 794 | 71.0 |
| 3 | 40 | 340 | 4 | 843 | 41.6 |
| 3 | 40 | 340 | 4 | 836 | 417 |
| 3 | 40 | 340 | 1 | 747 | 47.5 |
| 3 | 40 | 340 | 1 | 680 | 49.1 |
| 3 | 40 | 350 | 1 | 783 | 43.0 |
| 3 | 40 | 350 | 1 | 812 | 41.5 |

Comparative Example

Twelve glass sheets were formed according to conventional methods. Four glass sheets were formed from each of the following three glass types: Gorilla® Glass 3, Gorilla® Glass 4, and alkali aluminosilicate glass (all manufactured by Corning).

A primary ion exchange solution was prepared by mixing 55 wt. % KNO₃ and 45 wt. % NaNO₃. The mixture was heated to 450° C. and the twelve glass sheets were individually immersed in the primary ion exchange solution for the duration shown below in Table 2. Subsequently, the glass sheets were removed from the primary ion exchange solution and rinsed with water to remove any residual ion exchange solution.

A secondary ion exchange solution was prepared by mixing 95 wt. % KNO₃ and 5 wt. % Ca(NO₃)₂. The mixture was then heated to the temperature shown below in Table 2. The glass sheets were then immersed in the secondary ion exchange solution for the duration shown below in Table 2. The glass sheets were removed from the secondary ion exchange solution and rinsed with water to remove residual ion exchange solution.

Surface compressive stress and depth of layer for each sample were measured immediately after the ion exchange process on an Orihara FSM-6000 stress-optical meter. Results from the above measurements are provided below in Table 2.

TABLE 2

| Glass Type | Primary Ion Exchange Duration (hrs) | Secondary Ion Exchange Temperature (° C.) | Secondary Ion Exchange Duration (hrs) | Compressive Stress (MPa) | Depth of Layer (µm) |
| --- | --- | --- | --- | --- | --- |
| 1 | 40 | 390 | 0.25 | 756 | 89.3 |
| 1 | 40 | 390 | 0.25 | 729 | 87.7 |
| 1 | 40 | 460 | 4 | 767 | 97.2 |
| 1 | 40 | 460 | 4 | 757 | 9638 |
| 2 | 8 | 390 | 0.25 | 750 | 72.4 |
| 2 | 8 | 390 | 0.25 | 774 | 70.9 |
| 2 | 8 | 460 | 4 | 704 | 112.0 |
| 2 | 8 | 460 | 4 | 698 | 112.7 |
| 3 | 40 | 390 | 0.25 | 765 | 42.8 |
| 3 | 40 | 390 | 0.25 | 765 | 39.8 |
| 3 | 40 | 460 | 4 | 635 | 63.8 |
| 3 | 40 | 460 | 4 | 633 | 65.2 |

As discussed above, the second stage of a dual stage ion exchange process is the stage that imparts compressive stress to the glass. As shown by the Example and the Comparative Example, a monovalent or divalent cation nitrate may be added to the ion exchange solution to lower the operating temperature of second stage of the dual stage ion exchange process. Even though in the Example the operating temperature of the second stage ion exchange process is low when compared to conventional ion exchange processes, the depth of layer and compressive stress of the glass is about the same, or greater, than the depth of layer and compressive stress in the glass of the Comparative Example that used a conventional ion exchange solution and temperature in the second stage. Accordingly, the Example and Comparative Example show that glasses with high compressive stress and depth of layer can be formed using low-temperature ion exchange processes.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of chemically strengthening a glass, the method comprising:
    heating a first ion exchange solution to a first temperature from about 390° C. to about 480° C.;
    contacting the glass and the first ion exchange solution at the first temperature for a duration from about 5 hours to about 45 hours;
    heating a second ion exchange solution to a second temperature less than about 360° C.; and
    contacting the glass and the second ion exchange solution at the second temperature for a duration from about 0.5 hours to about 24 hours, wherein the glass is contacted with the first ion exchange solution at the first temperature before the glass is contacted with the second ion exchange solution at the second temperature, and the second ion exchange solution comprises a primary nitrate and at least one monovalent or divalent cation nitrate component that is different than the primary nitrate, wherein the at least one monovalent or divalent cation nitrate component is present in an amount from 1 wt. % to 10 wt. %.

2. The method according to claim 1, wherein the second ion exchange solution is heated to a second temperature from about 310° C. to about 350° C.

3. The method according to claim 1, wherein the at least one monovalent or divalent cation nitrate component is selected from the group consisting of $Ca(NO_3)_2$, $LiNO_3$, $Mg(NO_3)_2$, and $Sr(NO_3)_2$.

4. The method according to claim 1, wherein the at least one monovalent or divalent cation nitrate component is $Ca(NO_3)_2$.

5. The method of claim 4, wherein the ion exchange solution comprises the $Ca(NO_3)_2$ in an amount from about 2 wt. % to about 9 wt %.

6. The method of claim 4, wherein the ion exchange solution comprises the $Ca(NO_3)_2$ in an amount from about 3 wt. % to about 8 wt. %.

7. The method according to claim 1, wherein the first ion exchange solution comprises $KNO_3$ in an amount from about 50 wt. % to about 100 wt. %.

8. The method according to claim 1, wherein contacting the glass with the first ion exchange solution and the second ion exchange solution forms a compressive stress layer on a surface of the glass, and the compressive stress layer has a surface compressive stress greater than about 850 MPa.

9. The method according to claim 8, wherein the compressive stress layer has a surface compressive stress from about 850 MPa to about 1200 MPa.

10. The method according to claim 8, wherein a depth of the compressive stress layer is greater than about 40 μm.

11. The method according to claim 1, wherein the glass is a glass sheet having a thickness less than about 1 mm.

12. The method according to claim 11, wherein contacting the glass and the ion exchange solution forms a compressive stress layer on a surface of the glass, and the compressive stress layer has a surface compressive stress from about 250 MPa to about 850 MPa.

13. The method according to claim 12, wherein a depth of the compressive stress layer is less than about 30 μm.

* * * * *